US012057752B2

(12) United States Patent
Jensen et al.

(10) Patent No.: US 12,057,752 B2
(45) Date of Patent: Aug. 6, 2024

(54) STATOR FOR AN ELECTRICAL MACHINE, WIND TURBINE AND METHOD FOR MANUFACTURING A STATOR

(71) Applicant: Siemens Gamesa Renewable Energy A/S, Brande (DK)

(72) Inventors: Simon Vyff Jensen, Tørring (DK); Thyge Skovbjerg Thomsen, Herning (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 428 days.

(21) Appl. No.: 17/294,825

(22) PCT Filed: Jul. 17, 2019

(86) PCT No.: PCT/EP2019/069292
§ 371 (c)(1),
(2) Date: May 18, 2021

(87) PCT Pub. No.: WO2020/108809
PCT Pub. Date: Jun. 4, 2020

(65) Prior Publication Data
US 2021/0408862 A1    Dec. 30, 2021

(30) Foreign Application Priority Data
Nov. 28, 2018  (EP) ..................... 18208952

(51) Int. Cl.
*H02K 3/52*    (2006.01)
*H02K 1/14*    (2006.01)
(52) U.S. Cl.
CPC ............. *H02K 3/522* (2013.01); *H02K 1/148* (2013.01); *H02K 2201/15* (2013.01); *H02K 2203/09* (2013.01)

(58) Field of Classification Search
CPC .... H02K 3/522; H02K 1/148; H02K 2201/15; H02K 2203/09; H02K 3/505; H02K 7/183; Y02E 10/72
See application file for complete search history.

(56) References Cited

U.S. PATENT DOCUMENTS

| 4,943,749 A | 7/1990 | Ponce et al. |
| 2007/0232094 A1 | 10/2007 | Hoshika |

(Continued)

FOREIGN PATENT DOCUMENTS

| CN | 1044366 A | 8/1990 |
| CN | 101047327 A | 10/2007 |

(Continued)

OTHER PUBLICATIONS

International Search Report & Written Opinion issued Oct. 4, 2019 for PCT/EP2019/069292.

*Primary Examiner* — Tulsidas C Patel
*Assistant Examiner* — Joshua Kiel M Rodriguez
(74) *Attorney, Agent, or Firm* — Schmeiser, Olsen & Watts LLP

(57) ABSTRACT

Provided is a stator for an electrical machine, in particular a generator of a wind turbine, wherein the cylindrical stator includes multiple similar stator segments, each stator segment constituting a fraction of the circumference of the stator and having at least one coil element and one pre-installed bus bar segment per phase provided to or by the electrical machine, wherein each bus bar segment is electrically connected to a coil element of the respective phase, wherein at least two circumferentially adjacent stator segments form a section and multiple subsets of an even number of radially opposing sections are respectively assigned to a connector at a respective connection position along the circumference of the stator, wherein in each section, seg- (Continued)

mented bus bars for each phase are provided by connecting bus bar segments of adjacent stator segments.

10 Claims, 6 Drawing Sheets

(56) References Cited

U.S. PATENT DOCUMENTS

2017/0179776 A1* 6/2017 Hartmann .............. H02K 1/148
2017/0257005 A1   9/2017 Prucher
2018/0097322 A1* 4/2018 Harris, III ........... H01M 50/505

FOREIGN PATENT DOCUMENTS

| CN | 101860154 | A  | 10/2010 |
|----|-----------|----|---------|
| CN | 208112353 | U  | 11/2018 |
| EP | 0 375 419 | A2 | 6/1990  |
| EP | 2 924 847 | A1 | 9/2015  |
| GB | 2574017   | A  | 11/2019 |
| JP | 2012055035| A  | 3/2012  |

* cited by examiner

STATOR FOR AN ELECTRICAL MACHINE, WIND TURBINE AND METHOD FOR MANUFACTURING A STATOR

CROSS-REFERENCE TO RELATED APPLICATIONS

This application claims priority to PCT Application No. PCT/EP2019/069292, having a filing date of Jul. 17, 2019, which is based on EP Application No. 18208952.4, having a filing date of Nov. 28, 2018, the entire contents both of which are hereby incorporated by reference.

FIELD OF TECHNOLOGY

The following concerns a stator for an electrical machine, in particular a generator of a wind turbine, wherein the cylindrical stator comprises multiple similar stator segments, each stator segment constituting a fraction of the circumference of the stator and having at least one coil element and one pre-installed bus bar segment per phase provided to or by the electrical machine, wherein the bus bar segment is electrically connected to a coil element of the respective phase, wherein at least two circumferentially adjacent stator segments form a section and multiple subsets of an even number of radially opposing sections are respectively assigned to a connector at a respective connection position along the circumference of the stator. The following also concerns a wind turbine having a generator with such a stator and a method for manufacturing such a stator.

BACKGROUND

Large electrical machines, in particular generators for wind turbines, are often too heavy and/or to extensive to be manufactured as one part, in particular regarding the stack of sheets, the coil elements and other components constituting the stator body. It has thus been proposed to build the stator body from similar stator segments, each stator segment covering a part of the circumference of the stator, for example a predefined angle. The covered angles of the stator segments add up to 360°, such that assembling the stator segments yields the cylindrical stator body. In most cases, the stator will have essentially the shape of a hollow cylinder. To assemble the electrical machine, a rotor is added.

For example, stators are known which are made of twelve stator segments attached to each other. In this case, each stator segment covers an angular interval of 30°.

To provide electrical power to the electrical machine or to draw electrical power generated by the electrical machine, wherein usually three phases are used, the coil elements need to be connected to at least one respective external line using a connector usually provided at a certain circumferential connection position at one of the faces of the stator. To provide this electrical connection to the connector, usually bus bars made from copper which extend all around the stator in a circumferential direction and are connected to the coil elements of the respective phases are used. To facilitate manufacturing and assembling of the stator, it has been proposed to already provide pre-installed bus bar segments on the respective front face of the stator segments such that, once the stator segments are assembled to form the stator body, segment connection means or segment connector may be used where needed to create a segmented bus bar for each phase to connect the coil elements to the connection position and thus the connector. For example, in the case of an electrical machine using three phases, each stator segment may already be provided with three pre-installed bus bar segments, each for one phase. Segment connection means or segment connector may be omitted such that two segmented bus bar parts are formed, one for each of the two connecting lines of the corresponding phase.

Problems arise as soon as different parts of the stator are to be assigned to different electrical systems. For example, in a stator made of twelve stator segments, four disjoint sections, each comprising three adjacent stator segments, may be defined, such that two pairs of radially opposing sections result. Each pair of radially opposing sections may now be assigned to a different electrical system, such that the stator needs two connectors at different positions along the circumference, each connecting to, in particular, two lines for every phase. In this case, it has been proposed to provide each stator segment with six pre-installed bus bar segments such that three of them may be used for each connector, respectively.

However, the space for these bus bar segments is very constrained, such that problems in production of the stator segments and the stator itself result. The use of six bus bar segments for each stator segment is also expensive regarding the amount of copper. Additionally, the effort for connecting all those bus bar segments using segment connection means or segment connector to form segmented bus bars is very high. Until now, the narrow space constraints and the high cost in copper and connection parts have been accepted.

SUMMARY

An aspect relates to a stator design that has a simpler layout such that costs are reduced and assembly is simplified.

In a stator as initially described, in each section, segmented bus bars for each phase are provided by connecting bus bar segments of adjacent stator segments, which belong to the same phase, using segment connection means or segment connector, and the segmented bus bars of each section whose segmented bus bars are distanced from its associated connection position are connected to the respective connector by additional, continuous bus bars bypassing each stator segment between an end of the segmented bus bars closest to the connection position and the connection position.

The defined sections are, of course, disjoint, such that each segment is only connected to at least one connector. Each connector allows to connect two lines for each phase, as known. In an embodiment, three phases of the electrical current are used, such that there are three segmented bus bars formed by the connected pre-installed bus bar segments and three additional, continuous bus bars. It is noted that generally, of course, segment connection means or segment connector will not be provided at each segment boundary, resulting in different segment bus bar parts, for example of different sections and/or assigned to different lines of a phase.

It is thus proposed to reduce the number of pre-installed bus bar segments on each stator segment to the number of phases used, in particular three, despite having more than one connector to connect to more than one electrical system. Typically, each segment may connect to all three phases of one of the electrical systems. To be able to connect the segmented bus bars of each section also to distanced connectors, additional, longer, continuous bus bars are added which bypass all stator segments between the connection position and the respective ends of the segmented bus bars, since there is no need to provide any electrical connection to the bypassed stator segments. For example, in the case of four sections each having three stator segments, which are connected to two electrical systems, two long continuous bus bars for each phase suffice to provide the relevant electrical connections. That is, the additional, continuous bus bars in this case have the length of three stator segments which, in total, is equivalent to six segments, while the whole stator has twelve. Thus, one quarter of the bus bar copper is saved, along with half the segment connection means or segment connector. Also in general cases, since in parts of the circumference, no additional, continuous bus bars are needed, less copper is needed as well as less segment connection means or segment connector, since less pre-installed bus bar segments are provided on the stator segments.

Embodiments of the invention also solve the space constraint problem, since the three pre-installed bus bar segments may be electrically connected where needed before the additional, continuous bus bars are added, insuring a simplified production and manufacturing process. All in all, the connection of systems is secured by a standard flexible bus bar solution connecting the segmented bus bars fixed to the segments using long, additional, continuous bus bars bypassing other stator segments in a second bus bar system.

In this respect, a method for manufacturing a stator according to embodiments of the invention comprises the steps of providing the stator segments with the pre-installed bus bar segments attached to them and using the provided stator segments to build the cylindrical stator, connecting adjacent respective bus bar segments of each section using segment connection means or segment connector to form the segmented bus bars, whereafter the additional, continuous bus bars are added.

The stator according to embodiments of the invention is particularly advantageous in a generator of a wind turbine as the electrical machine, since these generators are usually very large and provided in many, for example twelve, stator segments which are assembled to form the stator body. Regarding wind turbines, often, multiple electrical systems are connected to each generator used in the wind turbine. Connections are all to be made at one face of the generator. Therefore, embodiments of the invention also concern the wind turbine, comprising at least one generator having a stator according to embodiments of the invention. It is noted that all remarks regarding the stator may, of course, also be applied to the method and the wind turbine.

In particular, the electrical systems, for example in the wind turbine, may be converters. In an exemplary embodiment, two converters may be provided as electrical systems in a nacelle of a wind turbine, in particular each on one lateral side on the end of the nacelle opposite to the hub. In the case that one of these converters fails, the wind turbine may still be operated.

In summary, embodiments of the invention provide the advantages of the reduction in the amount of copper and segment-to-segment connection means or segment-to-segment connector.

Additionally, easy access to pre-installed bus bar segments is possible. More space between flexible bus bars exiting the stator segment system may be provided.

Embodiments of the invention simplifies the bus bar layout, in particular by using continuous bus bars spanning multiple stator segments, which may, for example, adapt for thermal expansion and the like. In summary, a significant material cost reduction per generator may be achieved as well as a reduced assembly time in production.

In an embodiment, the additional, continuous bus bars are positioned in the same radial position as the segmented bus bars of each bypassed stator segment, but longitudinally shifted on the side of the segmented bus bars opposing the stator segments. In this manner, after the segment connection means or segment connector have been used to connect segments of a section to be bypassed, room parallel to the segmented bus bars can be used to place the additional, continuous bus bars there, providing a compact design.

In concrete embodiments, the connection positions may be at the boundary of two adjacent sections. If at least one of the sections at whose boundary a connector is placed is already assigned to this connector, no additional, continuous bus bar is required for this section. On the other hand, the distance to the at least one other section assigned to the same electrical system and thus the same connector may be minimized, in particular to one section which has to be bypassed in the case of four sections in total. In this concrete embodiment of four sections, the connection positions and thus the connectors may be located at adjacent boundaries, that is, opposing boundaries of one defined section. In such a configuration, additional continuous bus bars are only needed in one half of the circumference.

The segmented bus bars may be connected to associated additional, continuous bus bars by a cross connection means or cross connection, in particular bridging a longitudinal or radial distance between the bus bars. Since, the position of the additional, continuous bus bars is longitudinally shifted relative to the position of the pre-installed bus bar segments, the longitudinal distance may be bridged by the cross connection means or cross connection. In case the ends of the respective bus bars to be connected overlap circumferentially, a simple plate-like cross connection means or cross connection may be used.

It is, however, alternatively possible that at least one of the at least one cross connection means or cross connection is flexible and shaped to connect the in particular also circumferentially distanced respective bus bar ends. Known flexible bus bars are able to be bent in 90° angles without taking up too much space. Therefore, they are especially suitable as cross connection means or cross connection, in particular in the case that the bus bar ends to be connected are not only longitudinally displaced, but also circumferentially.

As already explained, in a concrete embodiment, the stator may comprise four sections, wherein the two connecting positions are provided at adjacent boundaries of two adjacent sections, wherein two sets of additional continuous bus bars are provided, each spanning one section. In the case of four sections, the sections may also be called "quadrants".

It is noted that bus bars are usually only needed on one face side of the stator, since the opposite side only has coil heads.

BRIEF DESCRIPTION

Some of the embodiments will be described in detail, with reference to the following figures, wherein like designations denote like members, wherein.

DETAILED DESCRIPTION

Figure 1:
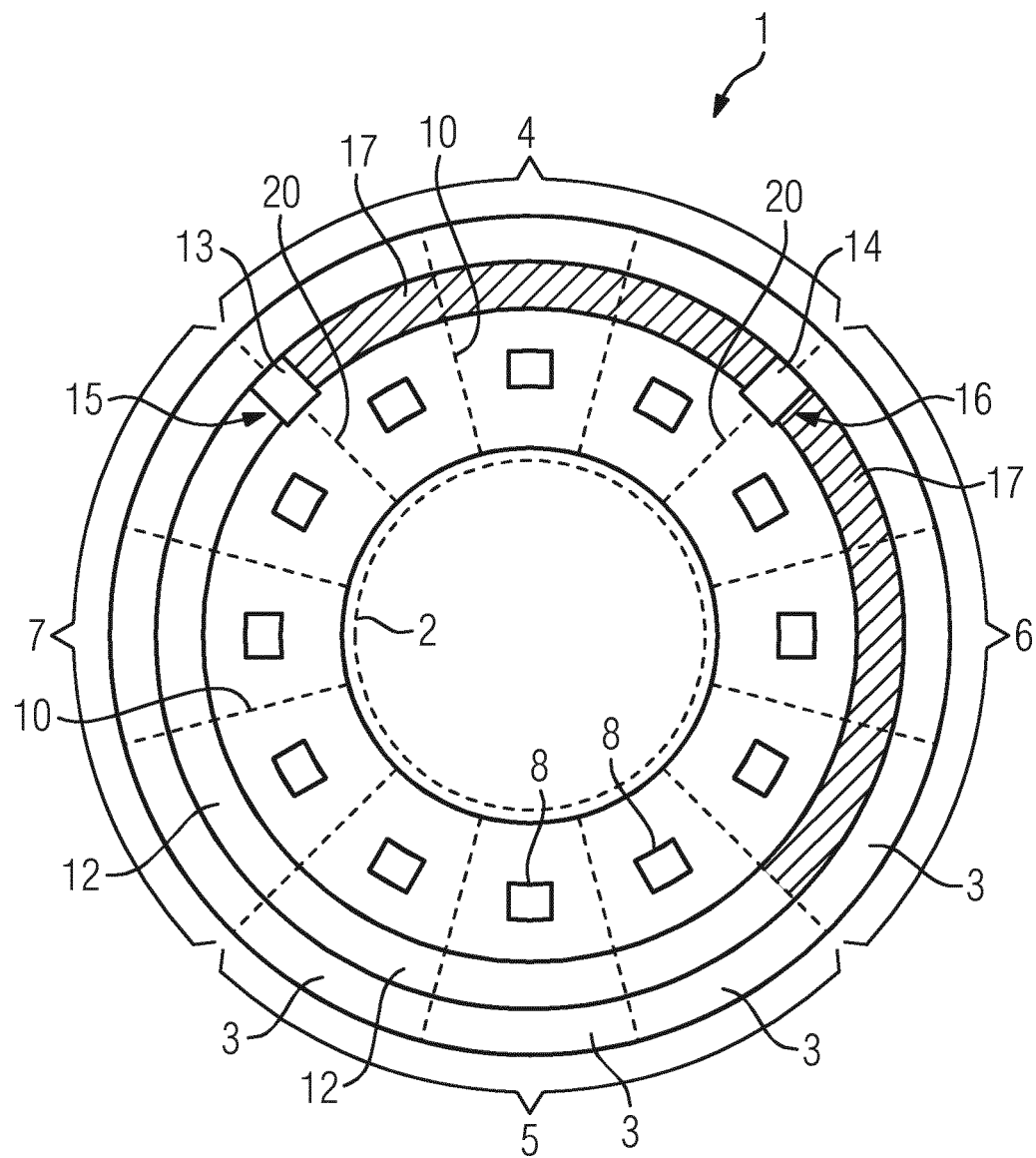
FIG. 1 is a principle frontal view of a stator according to embodiments of the invention.

FIG. 1 is a principle drawing of the front face of a stator according to embodiments of the invention. Combined with a rotor 2, which is only indicated in FIG. 1, an electrical machine results, in this case a generator of a wind turbine. In an example, 192 poles may be used.

Figure 2:
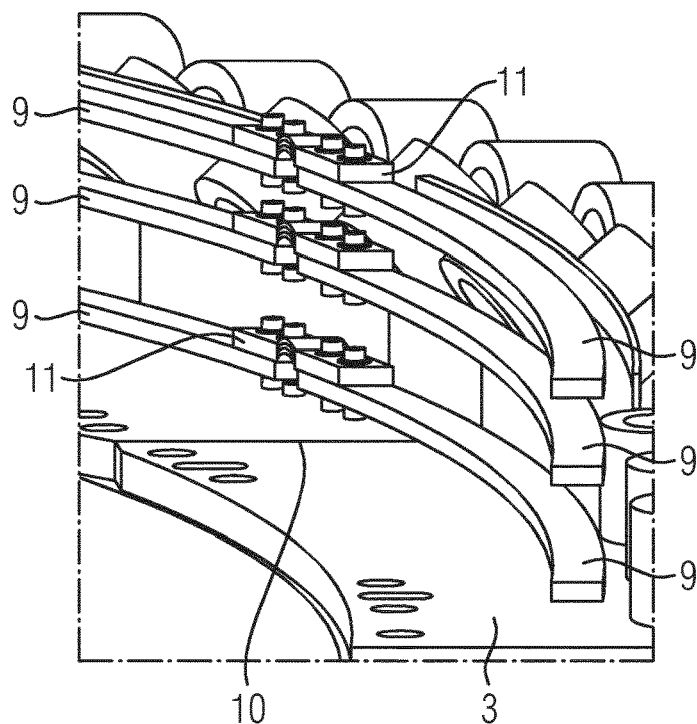
FIG. 2 shows a perspective view of a first detail of the stator.

The stator 1 is built from twelve segments 3, wherein three adjacent segments 3 each form a section 4, 5, 6, 7. Each segment has at least one coil element 8, as also only indicated in FIG. 1, and, as can be seen for example in the perspective view of FIG. 2, three pre-installed bus bar segments 9 made of copper, which are fixed to the segments 3. The generator, to which the stator 1 belongs, uses three phases, such that each bus bar segment 9 is associated with one phase and accordingly electrically connected to respective coil elements 8. At the boundary 10 of two segments 3, which lies inside a section 4, 5, 6, 7, segment connection means or segment connection 11 are used to connect adjacent bus bar segments, resulting in a segmented bus bar 12, wherein parts of the segmented bus bar 12 cover the whole 360° of the circumference direction of the stator 1.

In the example of 192 poles in the rotor 2, 16 poles are associated with each segment.

Figure 3:
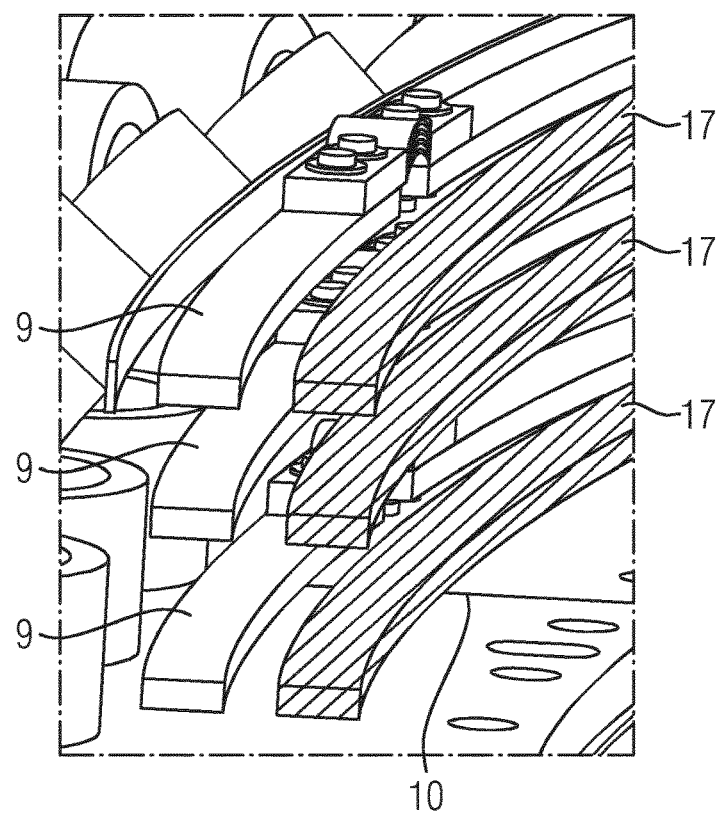
FIG. 3 shows a perspective view of a second detail of the stator.

In the current embodiment, opposing sections 4, 5 and 6, 7 are to be connected to different electrical systems, for example converters, such that two connectors 13, 14 at different connection positions 15, 16 (one left, one right) are provided, each able to connect to six lines (two per phase). While the segmented bus bars 12 of sections 7 and 4 each end at the connection positions 15, 16 of their respective connectors 13, 14, to be also able to connect the segmented bus bars 12 of sections 6 and 5 to their respective connectors 13, 14, additional, continuous bus bars 17, one for each phase, are used to bypass the respective sections 4, 5, that is, each of the two sets of three additional, continuous bus bars 17 has the length of three segments 3, i.e. continuously passes the intra-section boundaries 10, as can be seen in FIG. 3. While assembling the stator 1, first of all, the segment connection means or segment connection 11 are used to connect the bus bar segments 9 to the segmented bus bars 12, whereafter the additional, continuous bus bars 17 are added. To obtain a compact design, the additional, continuous bus bars 17 are added at the radial positions of the segmented bus bars 12, as can also be seen from the figures.

Only two sets of three additional, continuous bus bars 17 are needed, one, namely the right one of FIG. 1, to connect the segmented bus bars 12 of section 5 to connector 14, one, namely the upper one in FIG. 1, to connect the section 6 to connector 13. Neither section 5 nor section 7 have additional, continuous bus bars 17, such that the complexity is reduced, the amount of copper is reduced and less connection parts are needed.

Figure 4:
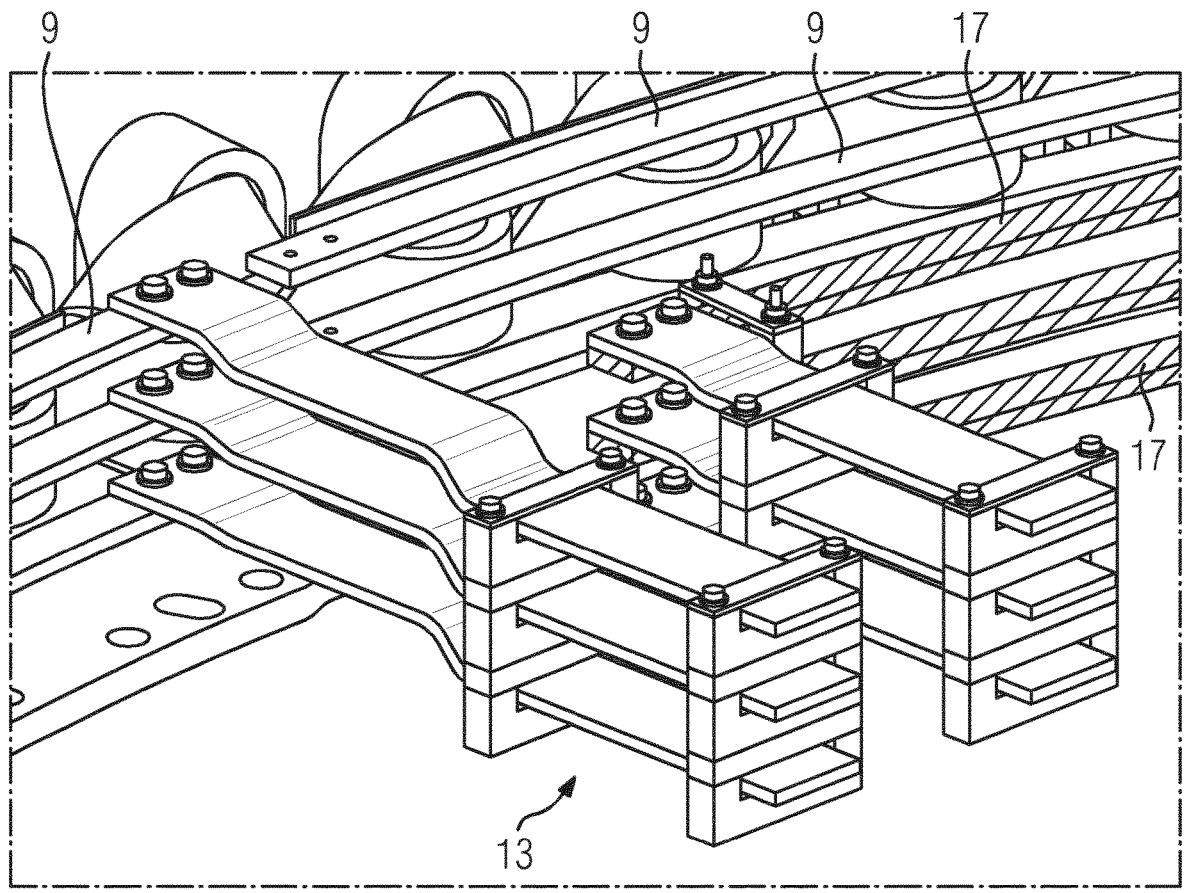
FIG. 4 shows a perspective view of a first connector.
Figure 5:
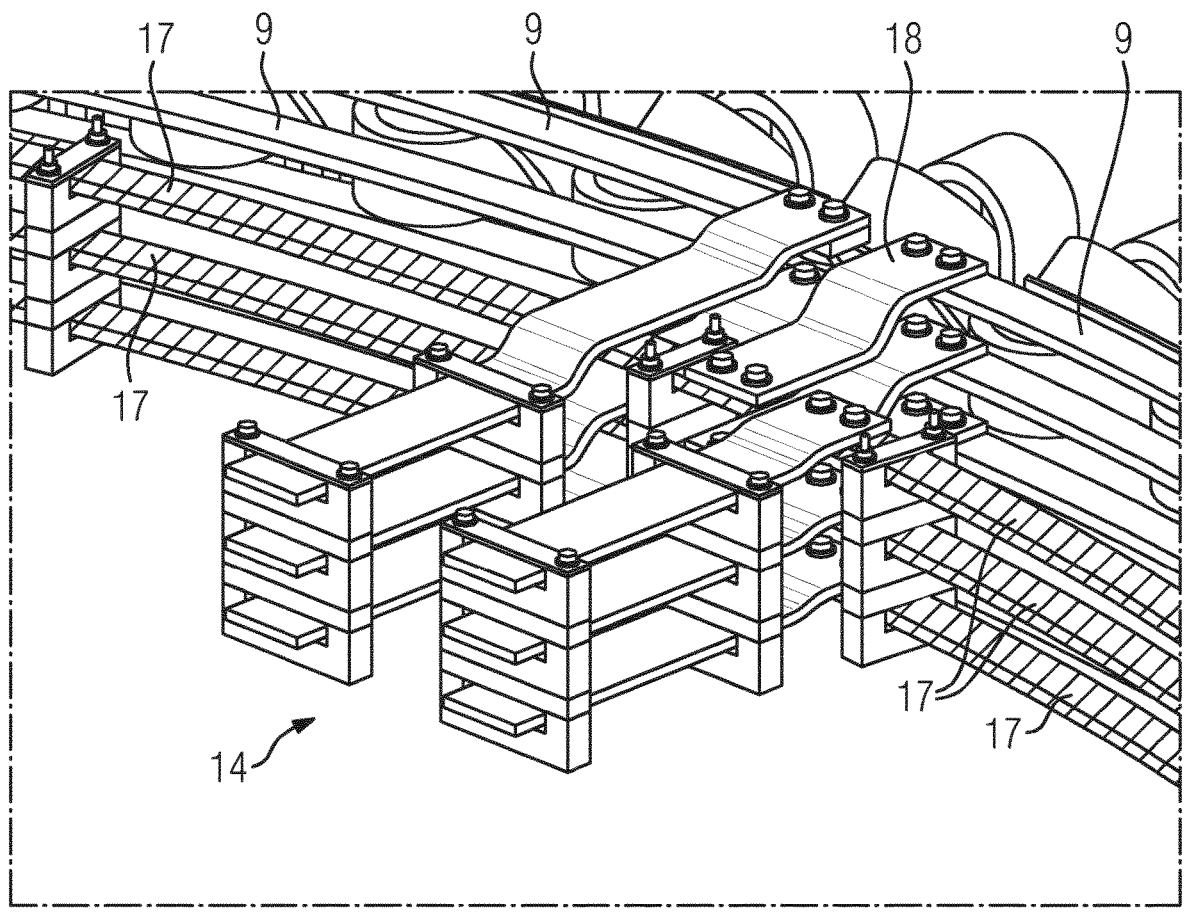
FIG. 5 shows a perspective view of a second connector and cross connection means or cross connection.

FIGS. 4 and 5 show perspective views of the connectors 13, 14. As can be seen from FIG. 4, in the connector 13, easy connection is provided as a direct connection to the bus bar segments 9/segmented bus bars 12 of section 7 and the additional, continuous bus bars 17 connected to the segmented bus bars 12 of section 6 is sufficient.

Regarding the connector 14, additionally, the ends of segmented bus bars 12 of section 6 need to be connected to the additional continuous bus bars 17 of section 4 leading to the connection position 15, that is, a cross connection is to be provided. In the embodiment of FIG. 5, plate-like cross connection means or cross connection 18 are used since only a longitudinal distance between the ends of the bus bar segments 9 of section 6 and the ends of the (correspondingly prolonged) additional, continuous bus bars 17 of section 4 needs to be provided.

Figure 6:
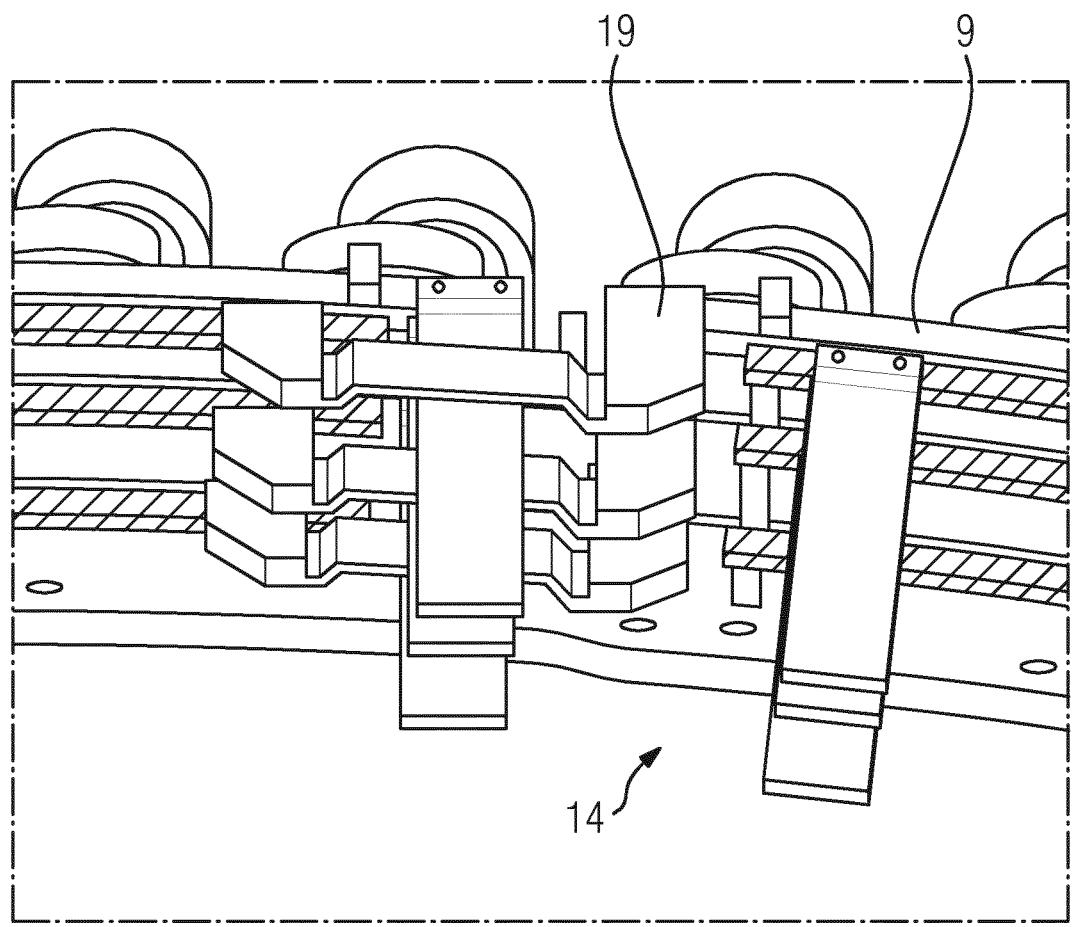
FIG. 6 is a perspective view of an alternative construction of the second connector area.

An alternative solution is shown in the perspective view of FIG. 6, wherein the additional continuous bus bars 17 of sections 4 are also circumferentially distanced from the ends of the segmented bus bar 12 of section 6, such that connection means or connection 19 comprising a flexible bus bar have been used, wherein the flexible bus bars have been bent into 90° angles to bridge the longitudinal and circumferential distances.

The connection positions 15, 16 are, in this embodiment, located at section boundaries 20.

Figure 7:
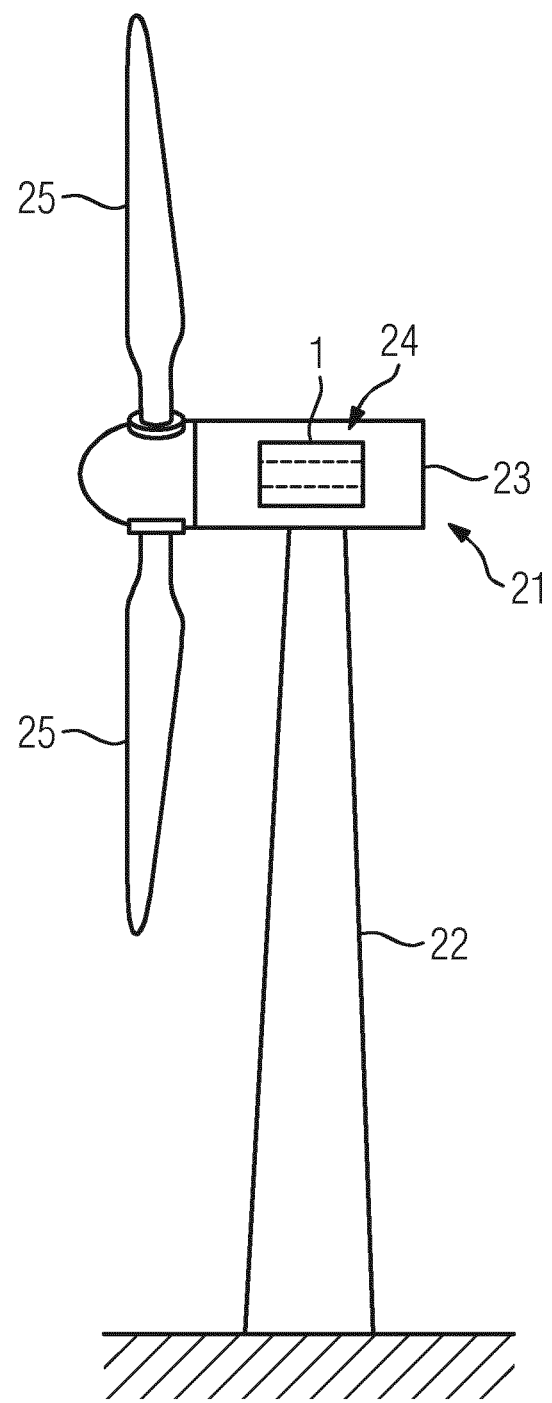
FIG. 7 shows a wind turbine according to embodiments of the invention.

FIG. 7 shows a wind turbine 21 according to embodiments of the invention. The wind turbine 21 comprises a tower 22 carrying a nacelle 23. A generator 24 having a stator 1 according to embodiments of the current invention is driven using wind interacting with blades 25 of the wind turbine 21.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A stator for an electrical machine, wherein the electrical machine is a generator of a wind turbine, wherein the stator comprises multiple similar stator segments, each stator segment constituting a fraction of the circumference of the stator and having at least one coil element and one pre-installed bus bar segment per phase provided to or by the electrical machine, wherein each bus bar segment is electrically connected to a coil element of the respective phase, wherein at least two circumferentially adjacent stator segments form a section and multiple subsets of an even number of radially opposing sections are respectively assigned to a connector at a respective connection position along the circumference of the stator, wherein each connector connects a subset to a different electrical system, wherein in each section, segmented bus bars for each phase are provided by connecting bus bar segments of adjacent stator segments, which belong to the same phase, using a segment connection, and the segmented bus bars of each section whose segmented bus bars are distanced from their associated connection position are connected to the respective connector by additional, continuous bus bars bypassing each stator segment between an end of the segmented bus bars closest to the connection position and the connection position.

2. The stator according to claim 1, wherein the additional, continuous bus bars are positioned in the same radial position as the segmented bus bars of each bypassed stator segment, but longitudinally shifted on the side of the segmented bus bars opposing the stator segments.

3. The stator according to claim 1, wherein the connection positions are at the boundary of two adjacent sections.

4. The stator according to claim 1, wherein the segmented bus bars are connected to associated additional, continuous bus bars by a cross connection.

5. The stator according to claim 4, wherein the cross connection is flexible and shaped to connect the respective bus bar ends.

6. The stator according to claim 5, wherein the cross connection is shaped to connect circumferentially distanced respective bus bar ends.

7. The stator according to claim 4, wherein the cross connection bridges a longitudinal distance between the bus bars.

8. The stator according to claim 1, wherein it comprises four sections, wherein the two connection positions are provided at adjacent boundaries of two adjacent sections, wherein two sets of additional, continuous bus bars are provided, each spanning one section.

9. A wind turbine, comprising at least one generator having a stator according to claim 1.

10. A method for manufacturing a stator according to claim 1, wherein the stator segments are provided with the pre-installed bus bar segments attached to them and used to build the cylindrical stator, adjacent respective bus bar segments are at least partly connected using segment connection to form the segmented bus bars, whereafter the additional, continuous bus bars are added.

\* \* \* \* \*